(No Model.) 3 Sheets—Sheet 1.
J. TAYLOR.
CAR TRUCK.
No. 507,050. Patented Oct. 17, 1893.
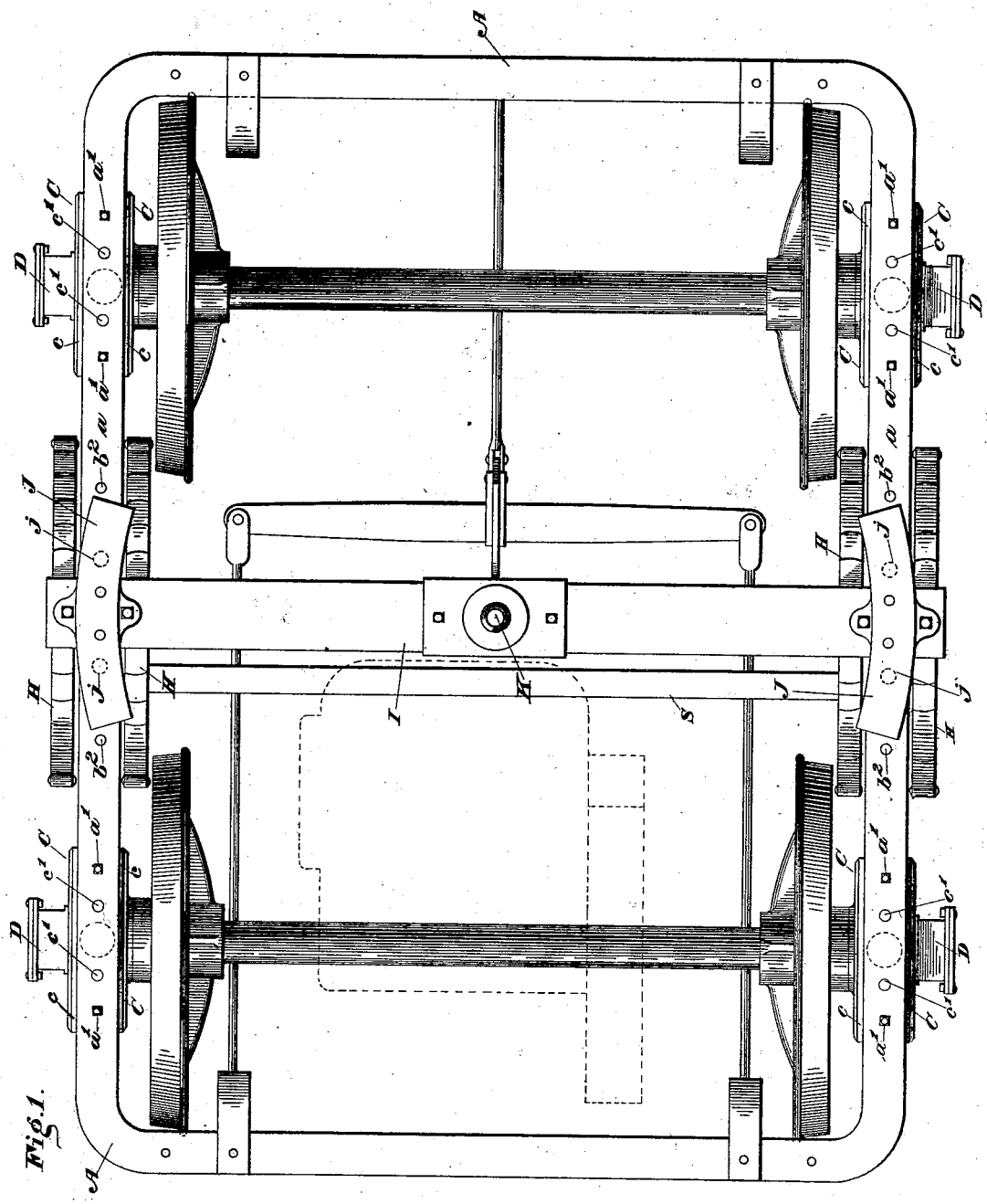
Witnesses:
M. E. Fowler
James R. Mansfield.
Inventor:
John Taylor
Alexander H. Dowell
By his Attorneys:

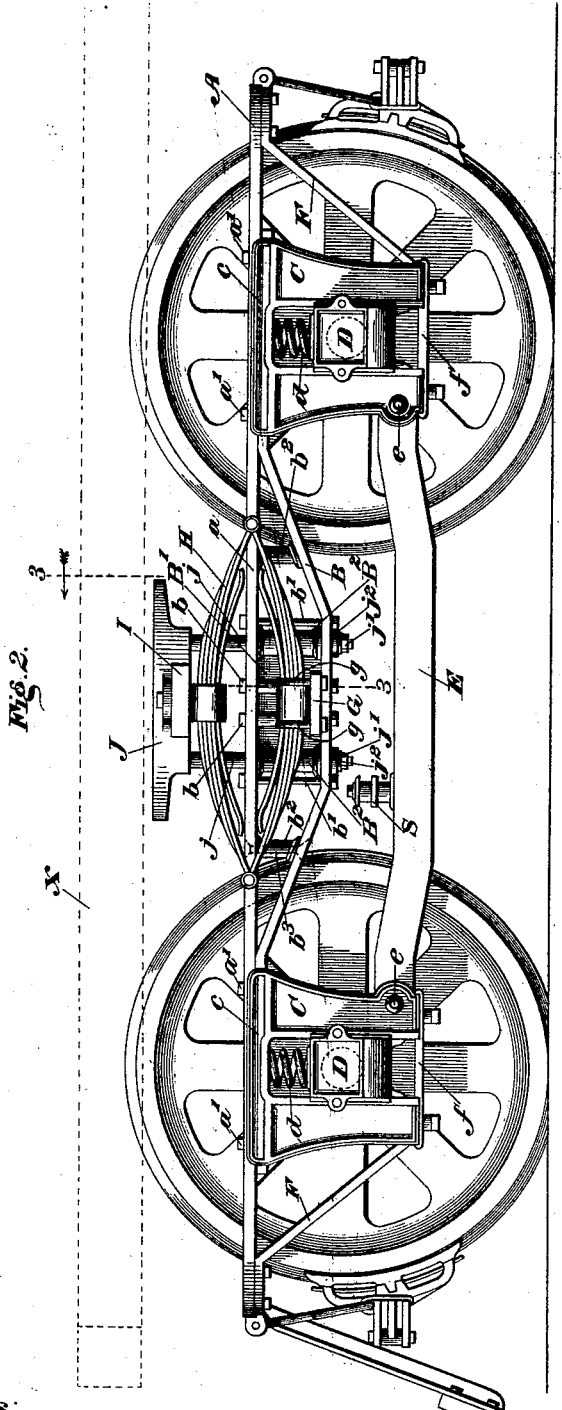

(No Model.) 3 Sheets—Sheet 3.
J. TAYLOR.
CAR TRUCK.
No. 507,050. Patented Oct. 17, 1893.
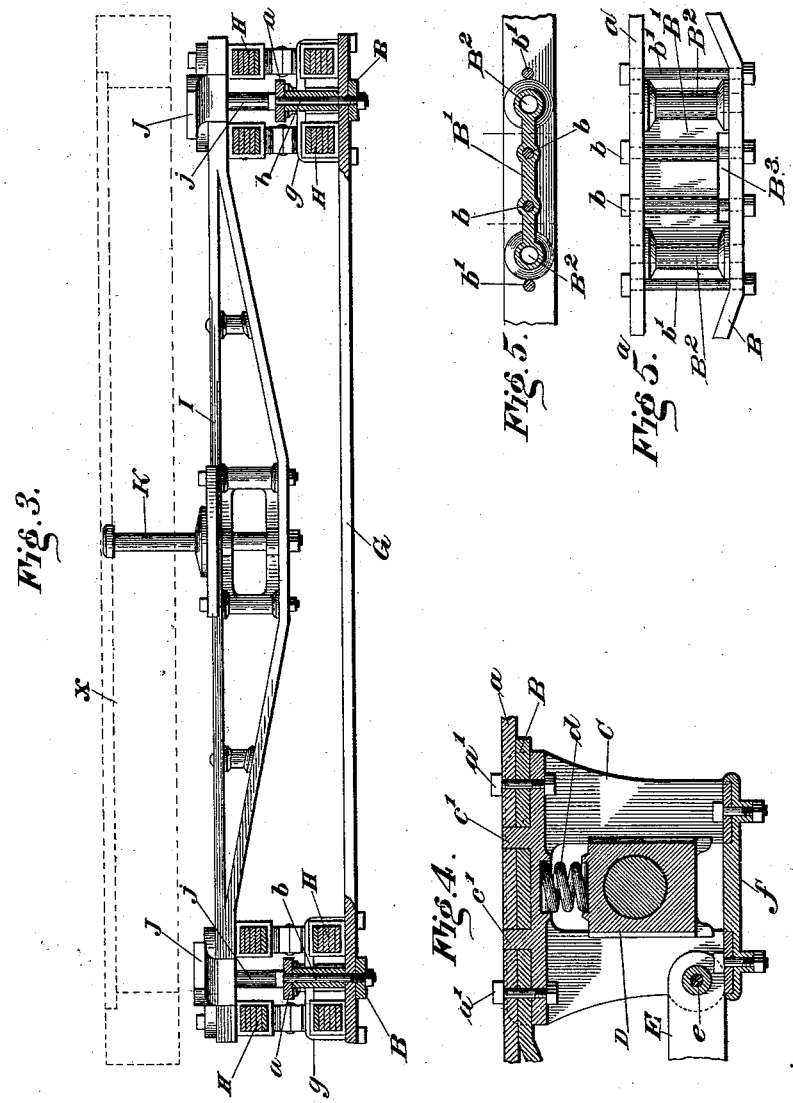
Witnesses:
M. E. Fowler
James R. Mansfield
Inventor:
John Taylor.
By his Attorneys, Alexander & Dowell

UNITED STATES PATENT OFFICE.

JOHN TAYLOR, OF TROY, NEW YORK.

CAR-TRUCK.

SPECIFICATION forming part of Letters Patent No. 507,050, dated October 17, 1893.

Application filed April 13, 1893. Serial No. 470,228. (No model.)

*To all whom it may concern:*

Be it known that I, JOHN TAYLOR, of Troy, in the county of Rensselaer and State of New York, have invented certain new and useful Improvements in Car-Trucks; and I do hereby declare that the following is a full, clear, and exact description thereof, reference being had to the accompanying drawings, and to the letters of reference marked thereon, which form part of this specification.

This invention is an improved pivotal four-wheel truck especially designed for electrical motor cars, in which the car bodies are mounted on trucks, one at each end of car, and the object of this invention is to provide a truck which will be of great strength, simple in construction, and having a close wheel base, and in which the motor-casing and mechanism can be suspended so as to be readily accessible without removing any part of the truck.

The invention is nearly related to the truck, shown and described in an accompanying application for Letters Patent filed April, 1893, and serially numbered 472,236, and the present invention has especial reference to the construction of the truck frame, and the peculiar mountings of the bolster thereon as will be clearly understood from the following description and claims.

In the drawings, Figure 1 is a top plan view of my improved truck. Fig. 2 is a side elevation thereof. Fig. 3 is a vertical transverse sectional view through the same on line 3—3 Fig. 2. Figs. 4, 5 and $5^a$ are details.

A designates a metallic frame formed of a continuous flat metal bar laid flatwise and extending around the truck forming the top and main portion of the truck frame. Underneath each side portion $a$ of the frame A is an inverted arched truss bar B the ends of which extend slightly beyond the pedestals C, C, at the sides of the truck frame. These truss bars are designed to carry the weight of the car body and between the centers of the bar B and frame A are placed castings B' which have one or more vertical openings near their centers for the passage of uniting bolts or rivets $b$ and have vertical sleeves $B^2$ at their ends, the openings in said sleeves coinciding with openings in the frame and truss bars as shown for the passage of bolster guiding pins hereinafter referred to. Exterior to castings B' the frame A and bars B are united by tie bolts $b'$ and intermediate the castings B' and pedestals C, the frame and bars may be further united by bolts $b^2$ which pass through separating and bracing sleeves $b^3$ interposed between the bars and frame as shown. The ends of bars B may be rigidly united to the frame by welding, riveting or otherwise as desired.

The pedestals C, C, resemble ordinary car pedestals, and have lips $c$ on their upper edges which embrace the lateral edges of bars B and frame A, and the pedestals are rigidly secured to the frame and bars by vertical through bolts $a'$ which pass through the top of pedestals as shown. To prevent shearing strain on bolts $a$, studs $c'$ are secured or cast on the top of the pedestals, and holes are made through the frame and bars B at proper points to fit over these studs, so that when weight is superimposed on the frame, intermediate the pedestals, the shearing off of the bolts $a$ by the longitudinal bending strain on the frame and bars is prevented.

The axle journal boxes D are of any suitable construction, and between them and the tops of pedestals are placed helical springs $d$ so that the frame has a spring mounting on the axles.

E designates the bottom stays between adjoining pedestals preferably constructed of two flat bars arranged parallel and set edgewise, and secured to the pedestals by bolts $e$. The jaws of the pedestals are connected by braces $f$ and flat metallic braces F are secured between the outer legs of pedestals and the corners of the frame so that the sides of the truck frame are thoroughly braced and trussed. The motor suspension bar S may be supported on the bottom stays E.

G designates a transverse stay bar extending across and between bars B, lying midway between the wheels. The ends of bars G pass through suitable recesses $B^3$ in the lower edges in castings B' and may be transfixed by bolts $b$ so as to be rigidly connected to the truss bars, or otherwise suitably secured against endwise movement.

H, H, are elliptic springs placed on the ends of bars G one at each side of each bar B. The adjoining springs H are secured in position on bar G by clips $g$. The springs H are constructed preferably as described in my aforesaid application.

I designates a bolster consisting of two flat metal bars laid flatwise, the lower one being trussed, and the whole constructed as described in my aforesaid application. The ends of this bolster are supported upon the springs H, H, and upon the bolster above the springs are rigidly secured curved side-bearing castings J, J, curved on the arc of a circle having the king bolt in the center of bolster for its axis. From the said castings J depend guide pins $j, j$, which are rigidly connected thereto one at each side of the bolster, and said pins depend through the sleeves $B^2$, and the corresponding openings in the frame and bars, as shown, being free to move vertically to permit the expansion and contraction of the springs, being limited in their upward movement by nuts $j'$ on their lower ends; cushions $j^2$ of any suitable material are interposed between the nuts and bottoms of bars B. These guide pins prevent longitudinal or lateral vibration of the bolster, and transfer the longitudinal and torsional thrusts of the bolster produced when the truck is rounding curves direct to the frame instead of through the springs and spring mountings.

The car body X is secured on the truck bolster by a king bolt K; thus there is but one direct connection between the body and truck and that is in the center of truck, so that the truck pivots at a fixed central point enabling the trucks to be run safely at a high speed around curves.

In this truck it will be observed that the weight of the body is transferred through the bolster springs H and bar G direct to the centers of truss bars B, B, so that the frame A serves principally as a brace and does not carry much weight. The bar G constitutes a tie bar to prevent the truck frame spreading laterally as well as a support for the springs. The motor suspension bars will also assist in preventing spreading of the frame.

While I have described the side pieces B' and bearings J as "castings" I contemplate making them of wrought metal and also welding them to the connected parts if desired, and consider such covered by the claims.

Semi-elliptic springs may be sometimes used for the full elliptic ones though the latter are preferred by me. It will further be observed that the springs are arranged parallel at each side of the frame and that they lie exterior to the wheels and intermediate the pedestals. This construction leaves ample room for the motors between the wheels.

Having described my invention, what I claim as new, and desire to secure by Letters Patent thereon, is—

1. The combination with a continuous truck frame, of a transverse stay bar, rigidly connected to and suspended from the main frame elliptical springs placed parallel with and on each side of the truck frame inside and outside thereof intermediate the pedestals, and all secured to and supported on the stay bar, substantially as described.

2. The combination with the truck frame and the pedestals, the inverted truss bar, and the transverse stay bar supported thereon: of the elliptical springs arranged outside and inside the frame at each side thereof intermediate the pedestals and secured to and supported on said stay bar, substantially as specified.

3. The combination with a continuous truck frame of the springs placed parallel and on each side thereof inside and outside the frame intermediate the pedestals and all being outside the wheels; with the bolster mounted on said springs and the guide pins for the bolster at the ends thereof, substantially as and for the purpose set forth.

4. The combination with the truck frame and the pedestals, with the springs arranged outside and inside the frame at each side thereof, said springs being located intermediate the pedestals and exterior to the truck wheels; with the bolster mounted on said springs, and guide pins for the bolster at each end thereof, substantially as described.

5. The combination with a continuous truck frame, of elliptical springs placed parallel and inside and outside the frame at each side thereof intermediate the pedestals and all being outside the wheels; with the bolster mounted on the springs and guide pins for the bolster at each end thereof playing through guide openings on the frame, substantially as and for the purpose set forth.

6. The combination in a truck frame, of the top frame, the pedestals, the flat inverted truss bar, intermediate the pedestals and connected to the tops thereof, and the side castings secured between the truss bar and top frame intermediate the pedestals, the bolster supporting springs, the bolster and guide pins fixed to the bolster playing through guide openings in the castings, substantially as described.

7. The combination in a truck frame, of the top frame, the pedestals, the flat inverted truss bars intermediate the pedestals and connected to the tops thereof, and the side castings secured between the truss bar and top frame intermediate the pedestals, and the transverse tie bar supported by said truss bars and lying intermediate the wheels, substantially as described.

8. The combination in a truck frame, of the top frame, the pedestals, the flat inverted truss bar intermediate the pedestals and connected to the tops thereof, and the side castings secured between the truss bar and top frame intermediate the pedestals; with the springs supported upon the truss bars intermediate the wheels, the bolster mounted on said springs, and the guide pins connected thereto playing through vertical sleeves on the castings, substantially as described.

9. The combination in a truck frame, of the top frame, the pedestals, the flat inverted truss bar intermediate the pedestals and connected to the tops thereof, and the side castings secured between the truss bars and top frame intermediate the pedestals, and the transverse tie bar supported by said truss bars and lying intermediate the wheels; with the springs supported upon the ends of tie bar, the bolster mounted on said springs, and the guide pins attached to the bolster, substantially as described.

10. The combination in a truck frame of the top frame formed of a continuous flat metal bar laid flatwise, the inverted truss bars attached to the side portions of said frame, the pedestals attached to the frame and ends of truss bars, the parallel elliptical springs supported by said truss bars located at each side of and parallel with each side bar and all outside the wheels and the bolster mounted on said springs, above the frame, substantially as described.

11. The combination in a truck frame, of the top frame formed of a continuous flat metal bar laid flatwise, the inverted truss bars attached to the side portions of said frame, the pedestals attached to the frame and ends of truss bars, the springs supported by said truss bars and the bolster mounted on said springs, the castings interposed between the truss bars and frame, and the guide pins attached to the bolster depending through sleeves on said casting, substantially as specified.

12. The combination of the pedestals having studs on their tops, the truss bars supported on said pedestals having openings to receive said studs, the top frame and the castings secured between the truss bars and frame intermediate the pedestals, substantially as described.

13. The combination of the pedestals having studs on their tops, the truss bars supported on said pedestals having openings to receive said studs, the top frame and the castings secured between the truss bars and frame intermediate the pedestals, the springs supported on said truss bars, the bolster mounted on said springs, and the guide pins for the bolster, substantially as and for the purpose specified.

14. The combination of the pedestals having studs on their tops, the truss bars supported on said pedestals having openings to receive said studs, the top frame and the castings secured between said truss bars and frame intermediate the pedestals, the transverse tie bar supported on said truss bar and extending beneath the castings, the springs mounted on said bar, the bolster superimposed on said springs, and the guide pins for the bolster, substantially as described.

15. The combination in a truck frame, of the top frame formed of a continuous flat metal bar laid flatwise, the inverted truss bars attached to the side portions of said frame, the sleeved castings interposed between the truss bars and frame, the transverse tie bar supported on and connecting said truss bars, the pedestals attached to the frame and ends of truss bars, the bottom stays between the pedestals the corner braces, the bolster springs, the bolster supports thereon, and the guide pins playing through the sleeves on the castings, substantially as and for the purpose set forth.

16. The combination in a truck frame of the top frame, formed of a continuous flat metal bar laid flatwise, the inverted truss bars attached to the side portions of said frame, the castings interposed between the truss bars and frame, the pedestals attached to the frame and ends of truss bars, the bottom stays between the pedestals and the corner braces, the springs supported on the truss bars, the bolster and the guide pins therefor, all constructed and arranged to operate substantially as and for the purpose described.

In testimony that I claim the foregoing as my own I affix my signature in presence of two witnesses.

JOHN TAYLOR.

Witnesses:
CORNELIUS J. EARLEY.
JAMES H. McGRAN.